United States Patent
Clark et al.

(10) Patent No.: US 10,911,957 B2
(45) Date of Patent: Feb. 2, 2021

(54) AUTOMATED SPECTRUM PLANNING VIA QUANTUM OPTIMIZATION

(71) Applicant: General Dynamics Mission Systems, Inc., Fairfax, VA (US)

(72) Inventors: William Clark, Fairfax, VA (US); Peter Oppong Okrah, Fairfax, VA (US)

(73) Assignee: General Dynamics Mission Systems, Inc., Fairfax, VA (US)

( * ) Notice: Subject to any disclaimer, the term of this patent is extended or adjusted under 35 U.S.C. 154(b) by 0 days.

(21) Appl. No.: 16/443,232

(22) Filed: Jun. 17, 2019

(65) Prior Publication Data

US 2020/0396617 A1    Dec. 17, 2020

(51) Int. Cl.
*H04W 16/02* (2009.01)
*H04W 72/04* (2009.01)
*H04W 24/02* (2009.01)
*H04W 16/22* (2009.01)

(52) U.S. Cl.
CPC ........... *H04W 16/02* (2013.01); *H04W 24/02* (2013.01); *H04W 72/0453* (2013.01); *H04W 16/22* (2013.01)

(58) Field of Classification Search
CPC .. H04W 16/02; H04W 24/02; H04W 72/0453
See application file for complete search history.

(56) References Cited

U.S. PATENT DOCUMENTS

| | | | |
|---|---|---|---|
| 6,327,300 B1 | 12/2001 | Souissi et al. | |
| 2006/0172705 A1* | 8/2006 | Parthasarathy | H04Q 7/32 |
| 2015/0078346 A1* | 3/2015 | Farhadi | H04W 16/14 |
| 2016/0033807 A1 | 2/2016 | Junge et al. | |
| 2018/0270669 A1 | 9/2018 | Fortman et al. | |
| 2018/0376342 A1 | 12/2018 | MacMullan et al. | |

* cited by examiner

*Primary Examiner* — Ronald B Abelson
(74) *Attorney, Agent, or Firm* — LKGlobal | Lorenz & Kopf, LLP

(57) ABSTRACT

A method of optimizing spectrum usage in real-time for a plurality of networks is provided. The method includes: retrieving local spectrum usage data in a geographical area in which spectrum allocation is to take place; modeling the plurality of networks, using one or more quantum statistical models, as a system of interacting particles, wherein each particle represents a node in a network and is configurable to exist in one of several quantum states; selecting bandwidth allocation and utilization constraints for the nodes based on a system allocation intent; solving an optimization problem related to the system allocation intent to estimate specific frequency and bandwidth distributions to be allocated to each node by applying the selected one or more quantum statistical models, the selected bandwidth allocation and utilization constraints, and the captured local spectrum data; and instructing each node to operate within the specific bandwidth allocated to the node.

20 Claims, 6 Drawing Sheets

AUTOMATED SPECTRUM PLANNING VIA QUANTUM OPTIMIZATION

TECHNICAL FIELD

Embodiments of the subject matter described herein relate generally to spectrum allocation. More particularly, embodiments of the subject matter relate to automatic spectrum allocation systems.

BACKGROUND

RF (radio frequency) spectrum allocation is manually planned, typically days in advance. When manually planned, RF spectrum allocation may not be optimized across multiple RF functional networks such as communication networks, radar networks, electronic warfare (EW) networks, etc. RF spectrum adaptation, to resolve conflict or interference, is uncoordinated and not real-time.

Spectrum managers and dynamic spectrum access systems that perform automatic spectrum management functions lack real-time awareness of spectrum usage variations across frequency, geography, and time. This reduces the efficiency of spectrum allocation and sharing, and thus reduces the total achieved mission benefit from the RF spectrum.

Hence, it is desirable to provide an automatic system for spectrum allocation that can take account of real-time spectral usage. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method of optimizing spectrum usage in real-time for a plurality of networks is disclosed. The method includes: retrieving local spectrum usage data in a geographical area in which spectrum allocation is to take place; modeling the plurality of networks, using one or more quantum statistical models, as a system of interacting particles, wherein each particle represents a node in a network and is configurable to exist in one of several quantum states at any one time; selecting bandwidth allocation and utilization constraints for the nodes based on a system allocation intent; solving an optimization problem related to the system allocation intent to estimate specific frequency and bandwidth distributions to be allocated to each node by applying the selected one or more quantum statistical models, the selected bandwidth allocation and utilization constraints, and the captured local spectrum data; and instructing each node to operate within the specific bandwidth allocated to the node.

A spectral usage allocation system including one or more processors configured by programming instructions encoded on non-transient computer readable media is disclosed. The system is configured to: retrieve local spectrum usage data in a geographical area in which spectrum allocation is to take place; model the plurality of networks, using one or more quantum statistical models, as a system of interacting particles, wherein each particle represents a node in a network and is configurable to exist in one of several quantum states at any one time; select bandwidth allocation and utilization constraints for the nodes based on a system allocation intent; solve an optimization problem related to the system allocation intent to estimate specific frequency and bandwidth distributions to be allocated to each node by applying the selected one or more quantum statistical models, the selected bandwidth allocation and utilization constraints, and the captured local spectrum data; and instruct each node to operate within the specific bandwidth allocated to the node.

Non-transient computer readable media encoded with programming instructions configurable to cause one or more processors to perform a method is disclosed. The method includes: retrieving local spectrum usage data in a geographical area in which spectrum allocation is to take place; modeling the plurality of networks, using one or more quantum statistical models, as a system of interacting particles, wherein each particle represents a node in a network and is configurable to exist in one of several quantum states at any one time; selecting bandwidth allocation and utilization constraints for the nodes based on a system allocation intent; solving an optimization problem related to the system allocation intent to estimate specific frequency and bandwidth distributions to be allocated to each node by applying the selected one or more quantum statistical models, the selected bandwidth allocation and utilization constraints, and the captured local spectrum data; and instructing each node to operate within the specific bandwidth allocated to the node.

Furthermore, other desirable features and characteristics will become apparent from the subsequent detailed description and the appended claims, taken in conjunction with the accompanying drawings and the preceding background.

BRIEF DESCRIPTION OF THE DRAWINGS

Embodiments of the subject matter will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to quantum mechanics, quantum statistical models, spectral analysis, wireless networks, communication networks, RF networks, electronic warfare networks, signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1A:
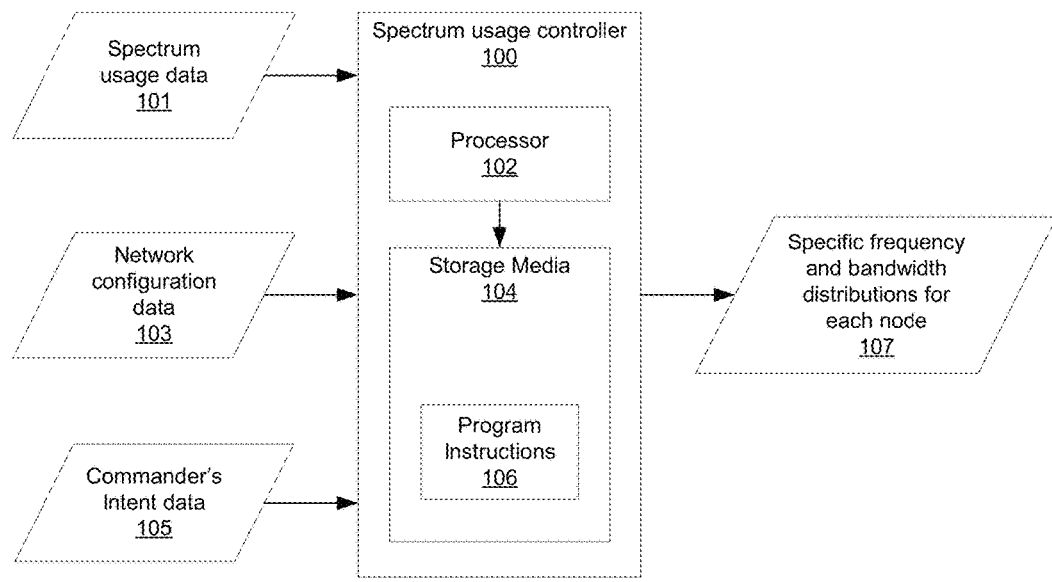
FIG. 1A is a block diagram depicting an example spectrum usage controller that is configured to optimize spectrum usage in real-time for a plurality of heterogeneous networks operating in the same geographical area, in accordance with some embodiments.

The subject matter described herein discloses apparatus, systems, techniques and articles for spectrum allocation among various nodes in a plurality of RF networks. FIG. 1A is a block diagram depicting an example spectrum usage controller 100. The example spectrum usage controller 100 is configured to optimize spectrum usage in real-time for a plurality of heterogeneous networks operating in the same geographical area. The example spectrum usage controller 100 is configured to input current spectral usage data for the geographical area for which spectral usage optimization is sought, the network configuration for the RF networks that are to operate within the geographical area, and an overall optimization strategy referred to herein as a commander's intent or system allocation intent. The example spectrum usage controller 100 is further configured to model each of the plurality of RF networks (e.g., communication, radar, EW) using quantum statistical models, solve an optimization problem based on the inputs applied to the quantum statistical models, and generate specific frequency and bandwidth distributions for each node in the plurality of networks.

The example spectrum usage controller 100 includes at least one processor 102 and a computer-readable storage device or media 104 encoded with programming instructions 106 for configuring the controller 100. The processor 102 may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media 104 may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions 106, used by the controller 100.

The example spectrum usage controller 100 in configured by the programming instructions 106 to retrieve local spectrum usage data 101 in geographical area in which spectrum allocation is to take place. The local spectrum usage data 101 may be retrieved from a system of ingest and analysis technologies used to capture local spectrum usage data. The ingest and analysis technologies may include electronic equipment such as commercial off the shelf (COTS) spectrum analyzers and/or electronic support measure (ESM) technology. Capturing local spectrum usage data may include monitoring RF transmissions in a geographical area over periods ranging from hours to days to weeks, with limited delay times between monitored RF usage data samples.

The example spectrum usage controller 100 in configured by the programming instructions 106 to model, using quantum statistical models, the plurality of RF networks as a system of interacting particles, wherein each particle represents a node in one of the plurality of RF networks. A node may be a subnet, or the like, that is to operate in one of the plurality of RF networks within the geographical area. Each node is configurable to exist in one of several quantum states at any one time. In a three-state example, the quantum states may refer to whether the node is to operate, in a narrow band (NB), middle band (MB), or wide band (WB). In another three-state example, the quantum states may refer to whether the node is to operate in a dense structured network, dense flat network, or sparse flat network. Other types and numbers of quantum states may exist in other examples.

The specific quantum statistical model for a network may be selected based on the nature of interaction among nodes. For example, if interference between nodes is expected then one type of quantum statistical model may be selected. If non-interference between nodes is expected, then another type of quantum statistical model may be selected. For example, a Bosonic statistical model may be selected when nodes interact without interference or without regard to frequency allocation, a Fermionic statistical model may be selected when nodes may interact with interference, and a Boltzmann statistical model may be selected for other implementations.

An example population distribution for a Bosonic statistical model may be formulated as follows:

$$N_i(g_i, B_i) = \frac{g_i}{Ae^{-\beta B_i} - 1}$$

$g_i$=State Degeneracy~Orthogonality
A, $\beta$=Coefficients determined by Constraints
$B_i$=bandwidth states, $N_i$=nodes, B=total available bandwidth
With constraints:
$\Sigma N_i$=N=Constant
$\Sigma N_i \cdot B_i \leq$B=Constant An example population distribution for a Fermionic statistical model may be formulated as follows:

$$N_i(g_i, B_i) = \frac{g_i}{Ae^{-\beta B_i} + 1}$$

$g_i$=State Degeneracy~Orthogonality
A, $\beta$=Coefficients determined by Constraints
$B_i$=bandwidth states, $N_i$=nodes, B=total available bandwidth
With constraints:
$\Sigma N_i$=N=Constant
$\Sigma N_i \cdot B_i \leq$B=Constant The interference and non-interference of node interaction may be modeled as degeneracy in the selected statistical model. The degeneracy can be set to unity (one) for interference and a multiplicative factor equal to the number of non-interference modes (e.g., the particular set of operational parameters, such as frequency, polarization, modulation, coding scheme, directionality, etc.) available to a node. For example, degeneracy may be modeled as a linear function of carrier to noise ratio (C/I) and degeneracy $g_i$ may be determined as follows:

$$g_i = 1 + \alpha_i \left(\frac{C}{I}\right),$$

wherein $$\alpha_i = (g_{i,max} - g_{i,min}) / \left(\frac{C}{I_{max}} - \frac{C}{I_{min}}\right)$$

and
C/I is Carrier to Interference ratio

Degeneracy may be extended to account for Directionality of Antennas and Polarization. For example, degeneracy $g_i$ may be determined as follows:

$$g_i = \left[1 + \alpha_i \left(\frac{C}{I}\right)\right][\zeta][\gamma],$$

wherein
  $\zeta$ is the Directional Antenna Factor
  $\gamma$ is the Polarization Factor Bandwidth allocation and utilization constraints for the nodes in the selected models may be selected based on an interpretation of the commander's intent (e.g., system allocation intent). Selecting bandwidth allocation and utilization constraints may include selecting the mix of bandwidth allocation and bandwidth utilization constraints based on an interpretation of the commander's intent. Selecting bandwidth allocation and utilization constraints may include selecting a hard bandwidth allocation constraint and a soft bandwidth utilization constraint, when ensuring bandwidth to all nodes takes precedence over utilization of available bandwidth. Selecting bandwidth allocation and utilization constraints may include selecting a soft bandwidth allocation constraint and a hard bandwidth utilization constraint when ensuring utilization of available bandwidth takes precedence over bandwidth allocation to all nodes. Selecting bandwidth allocation and utilization constraints may include selecting intermediate soft bandwidth allocation and soft bandwidth utilization constraints when ensuring some balance between bandwidth allocation and bandwidth utilization is desired.

The example spectrum usage controller 100 may select a Bosonic statistical model, a Fermionic statistical model, and/or a Boltzmann statistical model based on the commander's intent. For example, if the commander (e.g., the authority for setting the system BW allocation policy) wants bandwidth (BW) allocated equally among nodes operating in non-interfering/orthogonal modes, an optimization problem can be solved using Bosonic statistical models with hard BW allocation/soft BW utilization constraints to determine BW allocation. If the commander wants to maximize BW utilization among nodes operating in non-interfering/orthogonal modes, an optimization problem can be solved using Bosonic statistical models with soft BW allocation/hard BW utilizations constraints to determine BW allocation. If the commander wants to maximize BW allocation and utilization among nodes operating in modes that may interfere, an optimization problem can be solved using Fermionic statistical models with hard BW allocation/utilization constraints. If the commander wants to treat distinguishable networks differently, an optimization problem can be solved using a mix of Bosonic and Fermionic statistical models, or a Boltzmann statistical model depending on the commander's intent details.

The example spectrum usage controller 100 is configured to determine the optimal use of resources given the commander's intent. However, the optimal configuration may not fully satisfy the commander's intent, if available resources are insufficient.

The example spectrum usage controller 100 is configured to apply the selected quantum statistical model and bandwidth allocation and utilization constraints, and use the captured local spectrum data, to solve an optimization problem related to a commander's intent to estimate specific frequency and bandwidth distributions to be allocated to each node. Each node may then be instructed to operate within the specific frequency and bandwidth distributions allocated to the node.

Figure 1B:
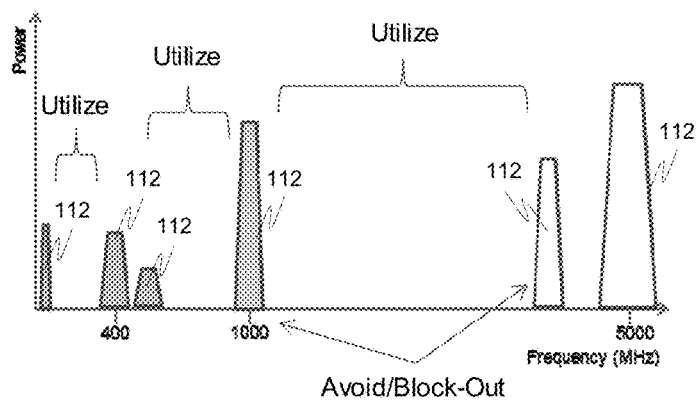
FIG. 1B is a diagram illustrating that certain frequency bands may be avoided or blocked out by the example spectrum usage controller when optimizing spectrum usage, in accordance with some embodiments.

The example spectrum usage controller 100 may be configured to utilize non-contiguous swaths of spectrum as illustrated in FIG. 1B. FIG. 1B is a diagram illustrating that certain frequency bands 112 may be avoided or blocked out (e.g., due to local frequency usage).

Figure 1C:
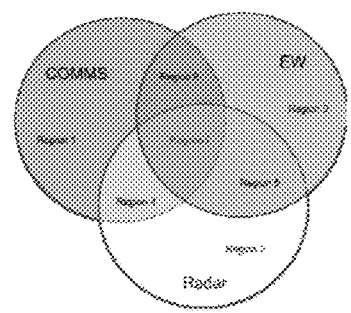
FIG. 1C is a diagram illustrating that different networks may have bandwidth that overlaps with bandwidth allocated to other networks, in accordance with some embodiments.

The example spectrum usage controller 100 may be configured for frequency reuse as illustrated in FIG. 1C. FIG. 1C is a diagram illustrating that different networks may have bandwidth that overlaps with bandwidth allocated to other networks. In this example, regions 4, 5, and 6 are heterogeneous regions shared by two different networks and region 7 is a heterogeneous region shared by 3 different networks. Regions 1, 2, and 3 are homogeneous regions that are used by only 1 network.

The example spectrum usage controller 100 may be used to preplan network usage and to operate continuously or periodically to monitor network operation within the geographical area. When the commander's intent or the local spectrum changes, the example spectrum usage controller 100 may adapt the statistic model, bandwidth allocation and utilization constraints in view of the changes.

Figure 2A:
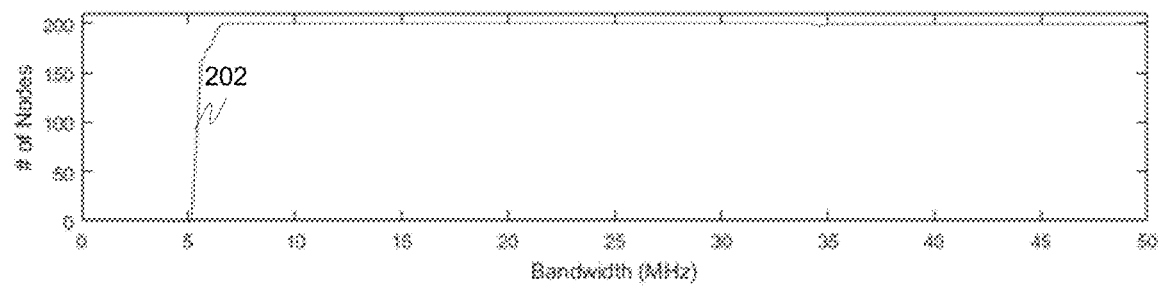
FIGS. 2A, 2B, and 2C are diagrams depicting example spectral usage characteristics for a plurality of networks that have been modeled using Bosonic statistical models wherein allocating bandwidth to network nodes is a priority at the expense of total bandwidth utilization, in accordance with some embodiments.
Figure 2B:
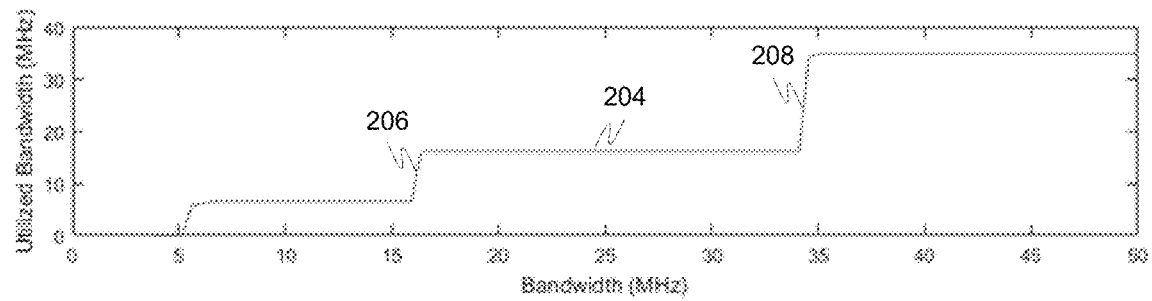
Figure 2C:
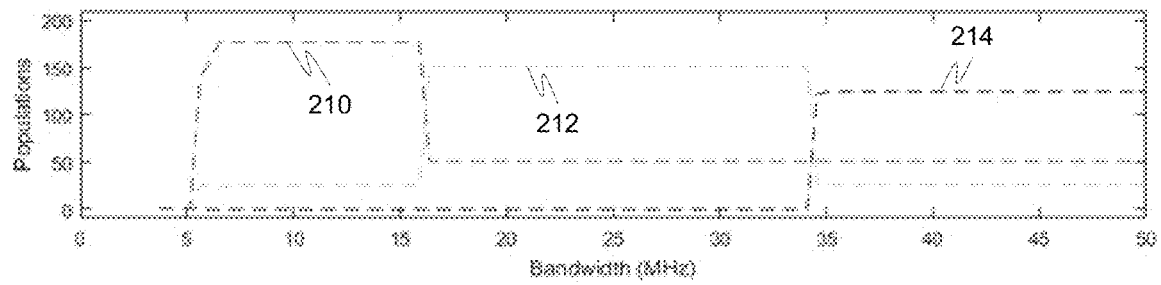

FIGS. 2A, 2B, and 2C are diagrams depicting example spectral usage characteristics for a plurality of networks that have been modeled using Bosonic statistical models wherein allocating bandwidth to network nodes is a priority at the expense of total bandwidth utilization. This situation may be good for resilient networks in highly contested environments. In this example, the plurality of networks collectively include 200 nodes; the nodes have three potential states—a 25 kHz narrow band (NB) state, a 100 kHz middle band (MB) state, and a 250 kHz wideband (WB) state; and there are 50 fixed NB nodes, 25 fixed MB nodes, and 0 fixed WB nodes. FIG. 2A shows a curve 202 representing a plot of the maximum number of nodes versus total available bandwidth (BW) when there is a hard population constraint (i.e., all nodes should be allocated BW).

FIG. 2B shows a curve 204 representing a plot of total utilized BW versus total bandwidth when there is a soft BW constraint (i.e., network BW utilization may be less than the total available BW). Transition areas 206 and 208 depicts state (BW) transitions. This illustrates a shift from one preferred BW state to another, as the amount of available bandwidth increases. As available bandwidth increases, the number of higher bandwidth states that can be supported in the system increases.

FIG. 2C shows three curves 210, 212, 214 illustrating population shifts (i.e., network nodes transition to higher BW states as available BW increases). Curve 210 is a plot of the population of nodes at the NB state versus total available bandwidth, curve 212 is a plot of the population of nodes at the MB state versus total available bandwidth, and curve 214 is a plot of the population of nodes at the WB state versus total available bandwidth. These curves illustrate the Bosonic bounds on BW allocation, when node usage is a priority, as a function of available spectrum.

Figure 3A:
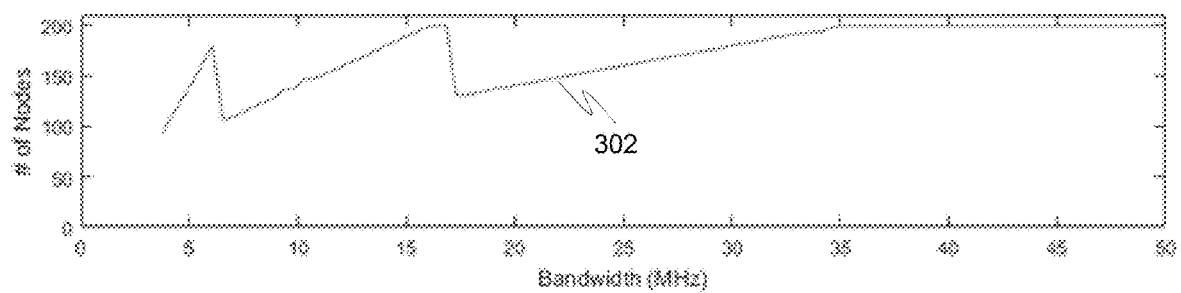
FIGS. 3A, 3B, and 3C are diagrams depicting example spectral usage characteristics for a plurality of networks that have been modeled using Bosonic statistical models wherein maximizing bandwidth utilization is a priority at the expense of some network nodes, in accordance with some embodiments.
Figure 3B:
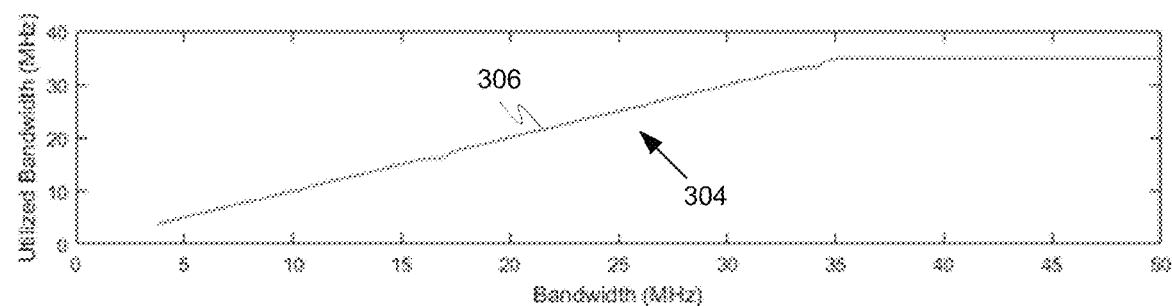
Figure 3C:
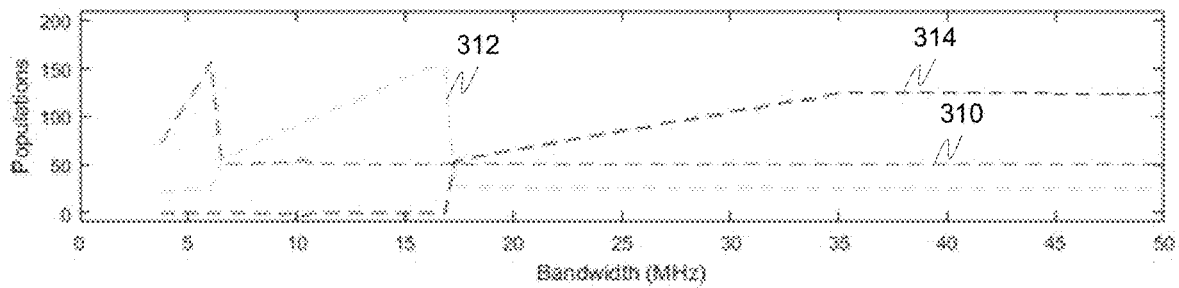

FIGS. 3A, 3B, and 3C are diagrams depicting example spectral usage characteristics for a plurality of networks that have been modeled using Bosonic statistical models wherein maximizing bandwidth utilization is a priority at the expense of some network nodes. This situation may be good for application rich networks that need to maximize bandwidth usage. In this example, the plurality of networks collectively include 200 nodes; the nodes have three potential states—a 25 kHz narrow band (NB) state, a 100 kHz middle band (MB) state, and a 250 kHz wideband (WB) state; and there are 50 fixed NB nodes, 25 fixed MB nodes, and 0 WB nodes. FIG. 3A shows a curve 302 representing a plot of the maximum number of nodes versus total available bandwidth (BW) when there is a soft population constraint (i.e., some nodes may not be allocated any BW).

FIG. 3B shows a curve 304 representing a plot of total utilized BW versus total bandwidth when there is a hard BW constraint (i.e., network BW utilization should be equal to or nearly equal to the total available BW). Curve 304 has a near linear area 306 that shows near perfect utilization of available BW up to the capacity of the network.

FIG. 3C shows three curves 310, 312, 314 illustrating population shifts (i.e., network nodes transition to higher BW states as available BW increases). Curve 310 is a plot of the population of nodes at the NB state versus total available bandwidth, curve 312 is a plot of the population of nodes at the MB state versus total available bandwidth, and curve 314 is a plot of the population of nodes at the WB state versus total available bandwidth. These curves illustrate the Bosonic bounds on BW allocation, when BW utilization is a priority, as a function of available spectrum.

Figure 4A:
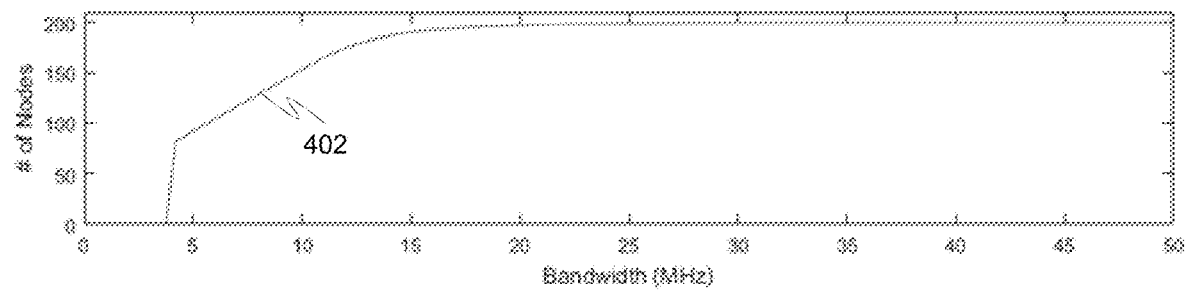
FIGS. 4A, 4B, and 4C are diagrams depicting example spectral usage characteristics for a plurality of networks that have been modeled using Fermionic statistical models when allocating frequency and bandwidth to network nodes while maximizing use of spectrum, in accordance with some embodiments.
Figure 4B:
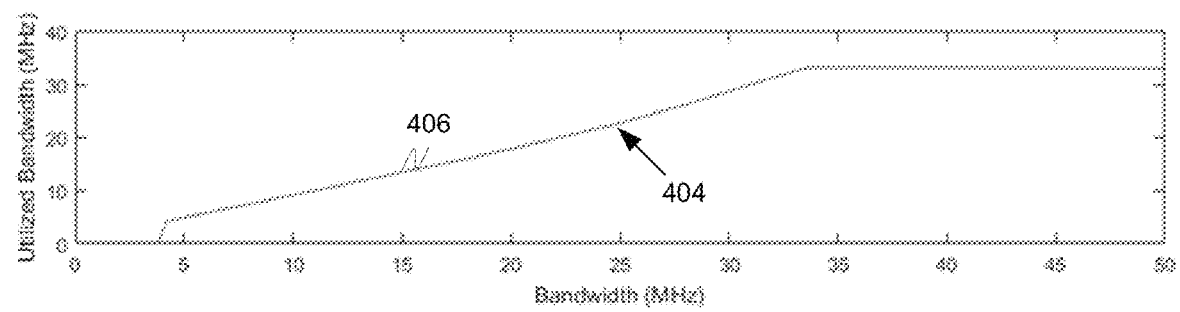
Figure 4C:
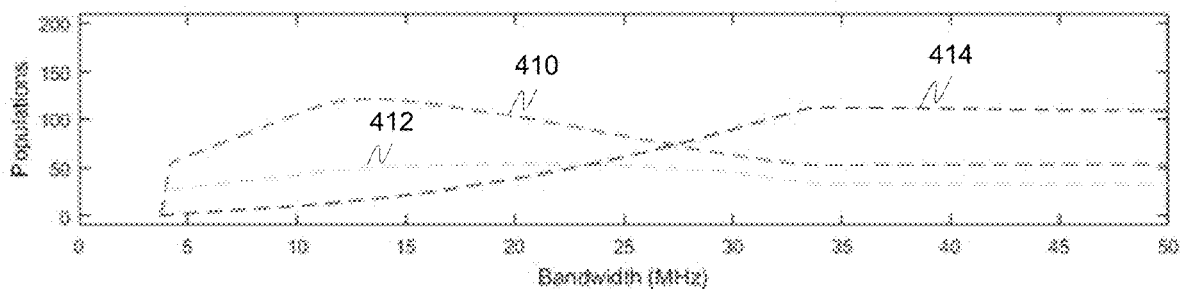

FIGS. 4A, 4B, and 4C are diagrams depicting example spectral usage characteristics for a plurality of networks that have been modeled using Fermionic statistical models when allocating frequency and bandwidth to network nodes while maximizing use of spectrum. This situation may be generally applicable to all networks—good for congested and contested environments. In this example, the plurality of networks collectively include 200 nodes; the nodes have three potential states—a 25 kHz narrow band (NB) state, a 100 kHz middle band (MB) state, and a 250 kHz wideband (WB) state; and there are 50 fixed NB nodes, 25 fixed MB nodes, and 0 WB nodes. FIG. 4A shows a curve 402 representing a plot of the maximum number of nodes versus total available bandwidth (BW) when there is a hard population constraint (i.e., all nodes should be allocated BW).

FIG. 4B shows a curve 404 representing a plot of total utilized BW versus total bandwidth when there is a soft BW constraint (i.e., network BW utilization may be less than the total available BW). Curve 404 has a near linear area 406 that shows near perfect utilization of available BW up to the capacity of the network.

FIG. 4C shows three curves 410, 412, 414 illustrating population shifts (i.e., network nodes transition to higher BW states as available BW increases). Curve 410 is a plot of the population of nodes at the NB state versus total available bandwidth, curve 412 is a plot of the population of nodes at the MB state versus total available bandwidth, and curve 414 is a plot of the population of nodes at the WB state versus total available bandwidth. These curves illustrate the Fermionic bounds on BW allocation as a function of available spectrum.

Figure 5:
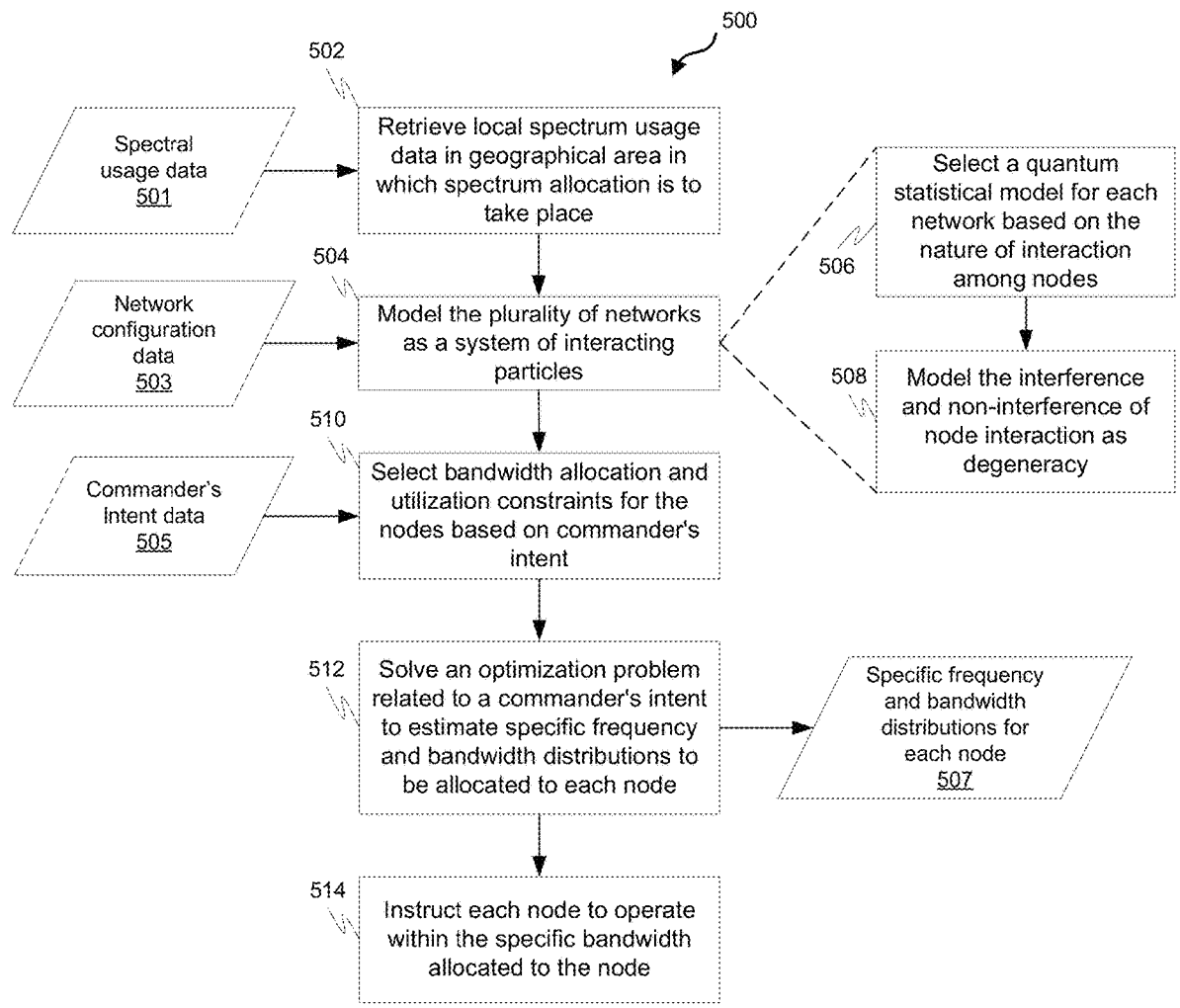
FIG. 5 is a process flow chart depicting an example process in an example spectrum usage controller for optimizing spectrum usage in real-time for a plurality of networks operating in the same geographical area, in accordance with some embodiments.

FIG. 5 is a process flow chart depicting an example process 500 in an example spectrum usage controller for optimizing spectrum usage in real-time for a plurality of networks operating in the same geographical area. The order of operation within the process 500 is not limited to the sequential execution as illustrated in the figure, but may be performed in one or more varying orders as applicable and in accordance with the present disclosure.

The example process 500 includes retrieving local spectrum usage data 501 in the geographical area in which spectrum allocation is to take place (operation 502). The retrieving local spectrum usage data may include capturing local spectrum usage data using ingest and analysis technologies comprising electronic support measure (ESM)

technology or commercial off the shelf (COTS) spectrum analyzers. The capturing local spectrum usage data may include monitoring RF emissions in the geographical region for periods ranging from hours to days to weeks.

The example process 500 includes modeling the plurality of networks as a system of interacting particles (operation 504), for example, using network configuration data 503. Each particle represents a node in a network and is configurable to exist in one of several quantum states (e.g., NB, MB, WB or dense structured network, dense flat network or sparse flat network) at any one time. The modeling the plurality of networks as a system of interacting particles includes selecting a quantum statistical model for each network based on the nature of interaction among nodes (operation 506). The selecting a quantum statistical model may include selecting a Bosonic statistical model when nodes interact without interference. The selecting a quantum statistical model may include selecting a Bosonic statistical model when nodes interact without regard to frequency allocation. The selecting a quantum statistical model may include selecting a Fermionic statistical model when nodes may interact with interference.

The modeling the plurality of networks as a system of interacting particles may further include modeling the interference and non-interference of node interaction as degeneracy (operation 508). The degeneracy may be set to unity (one) for interference and a multiplicative factor equal to the number of non-interference modes (what is meant by mode) available to a node.

The example process 500 includes selecting bandwidth allocation and utilization constraints for the nodes based on commander's intent (505) (operation 510). The selecting bandwidth allocation and utilization constraints may include selecting a hard bandwidth allocation constraint, and a soft bandwidth utilization constraint, when ensuring bandwidth to all nodes takes precedence over utilization of available bandwidth. The selecting bandwidth allocation and utilization constraints may include selecting a soft bandwidth allocation constraint, and a hard bandwidth utilization constraint when ensuring utilization of available bandwidth takes precedence over bandwidth allocation to all nodes. The selecting bandwidth allocation and utilization constraints may include selecting intermediate soft bandwidth allocation and soft bandwidth utilization constraints when ensuring some balance between bandwidth allocation and bandwidth utilization is desired. The selecting bandwidth allocation and utilization constraints may include selecting the mix of bandwidth allocation and bandwidth utilization constraints based on an interpretation of commander's intent.

The example process 500 includes solving an optimization problem related to a commander's intent to estimate specific frequency and bandwidth distributions 507 to be allocated to each node (operation 512). The solving is performed by applying the selected quantum statistical model and bandwidth allocation and utilization constraints, and using the captured local spectrum data, to solve the optimization problem.

The example process 500 may include instructing each node to operate within the specific bandwidth allocated to the node (operation 514). The example process 500 may further include adapting the statistic model and bandwidth allocation and utilization constraints when the commander's intent or the local spectrum changes.

Figure 6:
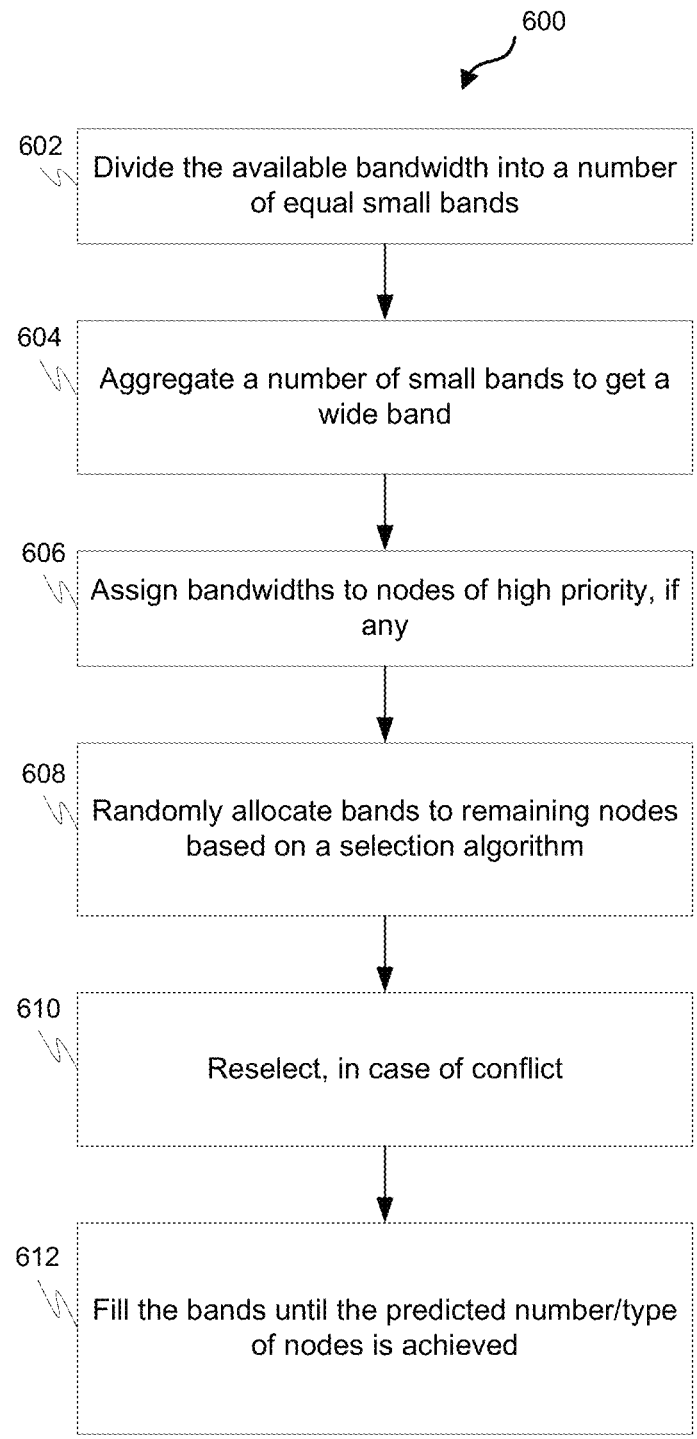
FIG. 6 is a process flow chart depicting an example process 600 for assigning channels to the nodes after the bandwidth allocation is made; in accordance with some embodiments.

FIG. 6 is a process flow chart depicting an example process 600 for assigning channels to the nodes after the bandwidth allocation is made. The example process 600 includes dividing the available bandwidth into a number of equal small bands (operation 602); aggregating a number of small bands to get a wide band (operation 604); assigning bandwidths to nodes of high priority, if any (operation 606); (d) randomly allocating bands to remaining nodes based on a selection algorithm (operation 608); (e) reselecting, in case of conflict (operation 610); and (f) filling the bands until the predicted number/type of nodes is achieved (operation 612).

Described herein are apparatus, systems, techniques and articles for spectrum allocation among various nodes in a plurality of RF networks. In one embodiment, a method of optimizing spectrum usage in real-time for a plurality of networks is provided. The method comprises: retrieving local spectrum usage data in a geographical area in which spectrum allocation is to take place; modeling the plurality of networks, using one or more quantum statistical models, as a system of interacting particles, wherein each particle represents a node in a network and is configurable to exist in one of several quantum states at any one time; selecting bandwidth allocation and utilization constraints for the nodes based on a system allocation intent; solving an optimization problem related to the system allocation intent to estimate specific frequency and bandwidth distributions to be allocated to each node by applying the selected one or more quantum statistical models, the selected bandwidth allocation and utilization constraints, and the captured local spectrum data; and instructing each node to operate within the specific bandwidth allocated to the node.

These aspects and other embodiments may include one or more of the following features. The retrieving local spectrum usage data may comprise capturing local spectrum usage data using ingest and analysis technologies comprising electronic support measure (ESM) technology or commercial off the shelf (COTS) spectrum analyzers. The capturing local spectrum usage data may comprise monitoring RF transmissions in the geographical area over a period of hours, over a period of days, or over a period of weeks. The modeling the plurality of networks as a system of interacting particles may comprise selecting a quantum statistical model for each network based on the nature of interaction among nodes. The modeling the plurality of networks as a system of interacting particles may further comprise modeling the interference and non-interference of node interaction as degeneracy, wherein degeneracy is set to unity for interference and a multiplicative factor equal to the number of non-interference modes available to a node. The selecting a quantum statistical model may comprise selecting a Bosonic statistical model when nodes interact without interference. The selecting a quantum statistical model may comprise selecting a Bosonic statistical model when nodes interact without regard to frequency allocation. The selecting a quantum statistical model may comprise selecting a Fermionic statistical model when nodes may interact with interference. The selecting bandwidth allocation and utilization constraints may comprise selecting a hard bandwidth allocation constraint and a soft bandwidth utilization constraint, when ensuring bandwidth to all nodes takes precedence over utilization of available bandwidth. The selecting bandwidth allocation and utilization constraints may comprise selecting a soft bandwidth allocation constraint and a hard bandwidth utilization constraint when ensuring utilization of available bandwidth takes precedence over bandwidth allocation to all nodes. The selecting bandwidth allocation and utilization constraints may comprise selecting intermediate soft bandwidth allocation and soft bandwidth utilization constraints when ensuring some balance between bandwidth allocation and bandwidth utilization is desired. The selecting bandwidth allocation and utilization constraints may comprise selecting the mix of bandwidth allocation and bandwidth utilization constraints based on an interpretation of the system allocation intent. The method may further comprise adapting the statistic model and bandwidth allocation and utilization constraints when the system allocation intent or the local spectrum changes.

In another embodiment, a spectral usage allocation system comprising one or more processors configured by programming instructions encoded on non-transient computer readable media is provided. The system is configured to: retrieve local spectrum usage data in a geographical area in which spectrum allocation is to take place; model the plurality of networks, using one or more quantum statistical models, as a system of interacting particles, wherein each particle represents a node in a network and is configurable to exist in one of several quantum states at any one time; select bandwidth allocation and utilization constraints for the nodes based on a system allocation intent; solve an optimization problem related to the system allocation intent to estimate specific frequency and bandwidth distributions to be allocated to each node by applying the selected one or more quantum statistical models, the selected bandwidth allocation and utilization constraints, and the captured local spectrum data; and instruct each node to operate within the specific bandwidth allocated to the node.

These aspects and other embodiments may include one or more of the following features. To retrieve local spectrum usage data the system may be configured to capture local spectrum usage data using ingest and analysis technologies comprising electronic support measure (ESM) technology or commercial off the shelf (COTS) spectrum analyzers. To capture local spectrum usage data the system may be configured to monitor RF transmissions in the geographical area over a period of hours, over a period of days, or over a period of weeks. To model the plurality of networks as a system of interacting particles the system may be configured to select a quantum statistical model for each network based on the nature of interaction among nodes. To model the plurality of networks as a system of interacting particles the system may be further configured to model the interference and non-interference of node interaction as degeneracy, wherein degeneracy is set to unity for interference and a multiplicative factor equal to the number of non-interference modes available to a node. To select a quantum statistical model the system may be configured to select a Bosonic statistical model when nodes interact without interference. To select a quantum statistical model the system may be configured to select a Bosonic statistical model when nodes interact without regard to frequency allocation. To select a quantum statistical model the system may be configured to select a Fermionic statistical model when nodes may interact with interference. To select bandwidth allocation and utilization constraints the system may be configured to select a hard bandwidth allocation constraint and a soft bandwidth utilization constraint, when ensuring bandwidth to all nodes takes precedence over utilization of available bandwidth. To select bandwidth allocation and utilization constraints the system may be configured to select a soft bandwidth allocation constraint and a hard bandwidth utilization constraint when ensuring utilization of available bandwidth takes precedence over bandwidth allocation to all nodes. To select bandwidth allocation and utilization constraints the system may be configured to select intermediate soft bandwidth allocation and soft bandwidth utilization constraints when ensuring some balance between bandwidth allocation and bandwidth utilization is desired. To select bandwidth allocation and utilization constraints the system may be configured to select the mix of bandwidth allocation and bandwidth utilization constraints based on an interpretation of the system allocation intent. The system may be further configured to adapt the statistic model and bandwidth allocation and utilization constraints when the system allocation intent or the local spectrum changes.

In another embodiment, non-transient computer readable media encoded with programming instructions configurable to cause one or more processors to perform a method is provided. The method comprises: retrieving local spectrum usage data in a geographical area in which spectrum allocation is to take place; modeling the plurality of networks, using one or more quantum statistical models, as a system of interacting particles, wherein each particle represents a node in a network and is configurable to exist in one of several quantum states at any one time; selecting bandwidth allocation and utilization constraints for the nodes based on a system allocation intent; solving an optimization problem related to the system allocation intent to estimate specific frequency and bandwidth distributions to be allocated to each node by applying the selected one or more quantum statistical models, the selected bandwidth allocation and utilization constraints, and the captured local spectrum data; and instructing each node to operate within the specific bandwidth allocated to the node.

These aspects and other embodiments may include one or more of the following features. The retrieving local spectrum usage data may comprise capturing local spectrum usage data using ingest and analysis technologies comprising electronic support measure (ESM) technology or commercial off the shelf (COTS) spectrum analyzers. The capturing local spectrum usage data may comprise monitoring RF transmissions in the geographical area over a period of hours, over a period of days, or over a period of weeks. The modeling the plurality of networks as a system of interacting particles may comprise selecting a quantum statistical model for each network based on the nature of interaction among nodes. The modeling the plurality of networks as a system of interacting particles may further comprise modeling the interference and non-interference of node interaction as degeneracy, wherein degeneracy is set to unity for interference and a multiplicative factor equal to the number of non-interference modes available to a node. The selecting a quantum statistical model may comprise selecting a Bosonic statistical model when nodes interact without interference. The selecting a quantum statistical model may comprise selecting a Bosonic statistical model when nodes interact without regard to frequency allocation. The selecting a quantum statistical model may comprise selecting a Fermionic statistical model when nodes may interact with interference. The selecting bandwidth allocation and utilization constraints may comprise selecting a hard bandwidth allocation constraint and a soft bandwidth utilization constraint, when ensuring bandwidth to all nodes takes precedence over utilization of available bandwidth. The selecting bandwidth allocation and utilization constraints may comprise selecting a soft bandwidth allocation constraint and a hard bandwidth utilization constraint when ensuring utilization of available bandwidth takes precedence over bandwidth allocation to all nodes. The selecting bandwidth allocation and utilization constraints may comprise selecting intermediate soft bandwidth allocation and soft bandwidth utilization constraints when ensuring some balance between bandwidth allocation and bandwidth utilization is desired. The selecting bandwidth allocation and utilization constraints may comprise selecting the mix of bandwidth allocation and bandwidth utilization constraints based on an interpretation of the system allocation intent. The method may further comprise adapting the statistic model and bandwidth allocation and utilization constraints when the system allocation intent or the local spectrum changes.

In another embodiment, a method of optimizing spectrum usage in real-time for a plurality of networks (e.g., communication, radar, EW) is provided. The method comprises: capturing local spectrum usage data using ingest and analysis technologies in geographical area in which spectrum allocation is to take place; modeling the plurality of networks as a system of interacting particles, wherein each particle represents a node and is configurable to exist in one of several discrete (quantum) states at any one time; selecting a quantum statistical model based on the nature of interaction among nodes, wherein Bosonic statistics is selected when nodes interact without interference (or without regard to frequency allocation), and Fermionic statistics is selected when nodes may interact with interference; modeling the interference and non-interference of node interaction as degeneracy, wherein degeneracy is set to unity (one) for interference, and a multiplicative factor equal to the number of non-interference modes available to a node; selecting a hard bandwidth allocation constraint, and a soft bandwidth utilization constraint, when ensuring bandwidth to all nodes takes precedence over utilization of available bandwidth; selecting a soft bandwidth allocation constraint, and a hard bandwidth utilization constraint when ensuring utilization of available bandwidth takes precedence over bandwidth allocation to all nodes; selecting intermediate soft bandwidth allocation and soft bandwidth utilization constraints when ensuring some balance between bandwidth allocation and bandwidth utilization is desired; selecting the mix of bandwidth allocation and bandwidth utilization constraints based on an interpretation of commander's intent; instructing each node to operate within the specific bandwidth allocated to the node; applying the selected quantum statistical model and bandwidth allocation and utilization constraints, and using the captured local spectrum data, to solve an optimization problem related to the commander's intent to estimate specific frequency and bandwidth distributions to be allocated to each node; and adapting the statistical model and bandwidth allocation and utilization constraints, as the commander's intent or the local spectrum changes.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of optimizing spectrum usage in real-time for a plurality of networks, the method comprising:
retrieving local spectrum usage data in a geographical area in which spectrum allocation is to take place;
modeling the plurality of networks, using one or more quantum statistical models, as a system of interacting particles, wherein each particle represents a node in a network and is configurable to exist in one of several quantum states at any one time, wherein the modeling the plurality of networks as a system of interacting particles comprises selecting a quantum statistical model for each network based on the nature of interaction among nodes;
selecting bandwidth allocation and utilization constraints for the nodes based on a system allocation intent;
solving an optimization problem related to the system allocation intent to estimate specific frequency and bandwidth distributions to be allocated to each node by applying the selected one or more quantum statistical models, the selected bandwidth allocation and utilization constraints, and the retrieved local spectrum usage data; and
instructing each node to operate within the specific bandwidth allocated to the node.

2. The method of claim 1, wherein the retrieving local spectrum usage data comprises capturing local spectrum usage data using ingest and analysis technologies comprising electronic support measure (ESM) technology or commercial off the shelf (COTS) spectrum analyzers.

3. The method of claim 2, wherein the capturing local spectrum usage data comprises monitoring RF transmissions in the geographical area over a period of hours, over a period of days, or over a period of weeks.

4. The method of claim 1, wherein the modeling the plurality of networks as a system of interacting particles further comprises modeling the interference and non-interference of node interaction as degeneracy, wherein degeneracy is set to unity for interference and a multiplicative factor equal to the number of non-interference modes available to a node.

5. The method of claim 1, wherein the selecting a quantum statistical model comprises selecting a Bosonic statistical model when nodes interact without interference or regard to frequency allocation.

6. The method of claim 1, wherein the selecting a quantum statistical model comprises selecting a Fermionic statistical model when nodes may interact with interference.

7. The method of claim 1, wherein the selecting bandwidth allocation and utilization constraints comprises selecting a hard bandwidth allocation constraint and a soft bandwidth utilization constraint, when ensuring bandwidth to all nodes takes precedence over utilization of available bandwidth.

8. The method of claim 1, wherein the selecting bandwidth allocation and utilization constraints comprises selecting a soft bandwidth allocation constraint and a hard bandwidth utilization constraint when ensuring utilization of available bandwidth takes precedence over bandwidth allocation to all nodes.

9. The method of claim 1, wherein the selecting bandwidth allocation and utilization constraints comprises selecting intermediate soft bandwidth allocation and soft bandwidth utilization constraints when ensuring some balance between bandwidth allocation and bandwidth utilization is desired.

10. The method of claim 1, wherein the selecting bandwidth allocation and utilization constraints comprises selecting a mix of bandwidth allocation and bandwidth utilization constraints based on an interpretation of the system allocation intent.

11. The method of claim 1, further comprising adapting the statistic model and bandwidth allocation and utilization constraints when the system allocation intent or the local spectrum changes.

12. A spectral usage allocation system comprising one or more processors configured by programming instructions encoded on non-transitory computer readable media, the system configured to:
retrieve local spectrum usage data in a geographical area in which spectrum allocation is to take place;
model a plurality of networks, using one or more quantum statistical models, as a system of interacting particles, wherein each particle represents a node in a network and is configurable to exist in one of several quantum states at any one time, wherein to model the plurality of networks as a system of interacting particles the system is configured to select a quantum statistical model for each network based on the nature of interaction among nodes;
select bandwidth allocation and utilization constraints for the nodes based on a system allocation intent;
solve an optimization problem related to the system allocation intent to estimate specific frequency and bandwidth distributions to be allocated to each node by applying the selected one or more quantum statistical models, the selected bandwidth allocation and utilization constraints, and the retrieved local spectrum usage data; and
instruct each node to operate within the specific bandwidth allocated to the node.

13. The system of claim 12, wherein to select a quantum statistical model the system is configured to select a Bosonic statistical model when nodes interact without interference or regard to frequency allocation.

14. The system of claim 12, wherein to select a quantum statistical model the system is configured to select a Fermionic statistical model when nodes may interact with interference.

15. The system of claim 12, wherein to select bandwidth allocation and utilization constraints the system is configured to select a hard bandwidth allocation constraint and a soft bandwidth utilization constraint, when ensuring bandwidth to all nodes takes precedence over utilization of available bandwidth.

16. The system of claim 12, wherein to select bandwidth allocation and utilization constraints the system is configured to select a soft bandwidth allocation constraint and a hard bandwidth utilization constraint when ensuring utilization of available bandwidth takes precedence over bandwidth allocation to all nodes.

17. The system of claim 12, wherein to select bandwidth allocation and utilization constraints the system is configured to select intermediate soft bandwidth allocation and soft bandwidth utilization constraints when ensuring some balance between bandwidth allocation and bandwidth utilization is desired.

18. The system of claim 12, wherein to model the plurality of networks as a system of interacting particles the system is configured to model the interference and non-interference of node interaction as degeneracy, wherein degeneracy is set to unity for interference and a multiplicative factor equal to the number of non-interference modes available to a node.

19. The system of claim 12, wherein to select bandwidth allocation and utilization constraints the system is configured to select a mix of bandwidth allocation and bandwidth utilization constraints based on an interpretation of the system allocation intent.

20. Non-transitory computer readable media encoded with programming instructions configurable to cause one or more processors to perform a method, the method comprising:

retrieving local spectrum usage data in a geographical area in which spectrum allocation is to take place;

modeling a plurality of networks, using one or more quantum statistical models, as a system of interacting particles, wherein each particle represents a node in a network and is configurable to exist in one of several quantum states at any one time, wherein the modeling the plurality of networks as a system of interacting particles comprises selecting a quantum statistical model for each network based on the nature of interaction among nodes;

selecting bandwidth allocation and utilization constraints for the nodes based on a system allocation intent;

solving an optimization problem related to the system allocation intent to estimate specific frequency and bandwidth distributions to be allocated to each node by applying the selected one or more quantum statistical models, the selected bandwidth allocation and utilization constraints, and the retrieved local spectrum usage data; and instructing each node to operate within the specific bandwidth allocated to the node.

* * * * *